United States Patent [19]
Seelig

[11] 3,811,665
[45] May 21, 1974

[54] FLEXURAL PIVOT WITH DIAPHRAGM MEANS

[75] Inventor: Frederick A. Seelig, New Hartford, N.Y.

[73] Assignee: The Bendix Corporation, Teterboro, N.J.

[22] Filed: Sept. 5, 1972

[21] Appl. No.: 286,369

[52] U.S. Cl. .............................................. 267/160
[51] Int. Cl. ............................................ F16f 1/18
[58] Field of Search .................... 267/150, 160, 182

[56] References Cited
UNITED STATES PATENTS
3,073,584  1/1963  Troeger ............................. 267/160
3,181,851  5/1965  Troeger ............................. 267/160

Primary Examiner—Robert G. Sheridan
Attorney, Agent, or Firm—Anthony F. Cuoco; S. H. Hartz

[57] ABSTRACT

A flexural pivot device having a pair of flat crossed springs, each of the crossed springs having at least one side projection at each end extending perpendicularly from the side end of its spring and being the same thickness as the spring to provide connecting segments, two arcuate quadrant elements and two divided quadrant elements positioned alternately between the connecting segments and joined thereto to provide a tubular assembly having two semi-circular members interconnected by crossed flat springs and spaced at the lengthwise edges thereof, first outer sleeve means connected to one of the semi-circular-like members and radially spaced from the other member, second outer sleeve means connected to the other of the semi-circular members and radially spaced from the first sleeve member, either the first outer sleeve means and/or the second outer sleeve means having flexible diaphragm means fixedly secured thereto thereby allowing relatively low axial and torsional stiffness while permitting relatively high radial or shear stiffness.

9 Claims, 8 Drawing Figures

PATENTED MAY 21 1974

3,811,665

FLEXURAL PIVOT WITH DIAPHRAGM MEANS

FIELD OF THE INVENTION

This invention relates to devices for supporting a mechanism which is to be limitedly rotated about an axis and more particularly concerns improvements in flexural pivot devices which provide limited relative rotation between two parts by flexing crossed, flat springs connecting the two parts.

DESCRIPTION OF THE PRIOR ART

Prior art flexural pivots, such as those described in U.S. Pat. No. 3,073,548 issued to Henry Troeger, were concerned with providing a flexural device having two or more sleeve means rotatable relative to each other on a common axis. These pivots were either of the cantilever type wherein one member could be fixed and the other member rotated relative thereto, or of the double-end type wherein the center member could be fixed and the two end members rotated relative thereto or the end members could be fixed and a center member rotated relative to the ends. These pivots were found when subject to radial loads to be less rigid than desirable. In such devices, the core structures axial bending would not be smoothly distributed over the entire axial length of the core, due to the discontinuity in the core thickness. Such uneven axial bending concentrated the radial load disproportionately on small sections of the inner connecting spring structure, often causing buckling of a part of the spring structure, thereby damaging or destroying the device. Later another flexural pivot device disclosed in my commonly assigned U.S. Pat. No. 3,319,951 taught a pivot that more evenly shared radial loads by the spring members reducing the risk of spring damage and which simultaneously raised the radial load capacity of a flexural pivot of fixed physical dimensions. All of the prior art pivots, however, were primarily concerned with providing rotational freedom along a common axis and none of these devices had means for permitting an additional degree of freedom in the axial direction. That is, whenever these prior art pivots were subject to axial movement caused for example by thermal changes, sliding, friction and/or extremely high forces along the axis of the pivot were ordinarily created causing damage to either the pivot itself or to adjoining structure.

SUMMARY OF THE INVENTION

In the preferred embodiment according to the invention, the flexural pivot having axial freedom constitutes a pair of flat, crossed springs, each of the crossed springs having a projection at each end extending perpendicularly from the side end of its spring and being the same thickness as the spring to provide connecting segments, two arcuate quadrant elements and two divided quadrant elements positioned alternately between the connecting segments and joined thereto to provide a tubular assembly having two semi-circular members interconnected by crossed, flat springs and spaced at the lengthwise edges thereof, two outer sleeve members each connected to one of the semi-circular members and radially spaced therefrom, and at least one flexible diaphragm member fixedly secured to or integrally formed with one of said outer sleeve members thereby allowing relatively low axial and torsional stiffness without sacrificing the radial or shear stiffness of the pivot.

It is, therefore, a primary object of this invention to provide a flexural pivot having an additional degree of freedom while maintaining its normal capabilities and characteristics in the original rotational direction. The pivot according to this invention permits movement in the direction of the axis of the pivot where such movement is necessary due to thermal changes which ordinarily create sliding, friction, and/or extremely high forces along the axis of the pivot.

It is another object of this invention to provide a flexural pivot which absorbs movement along its axis from whatever source so that damage to either the pivot or adjoining structure is prevented.

Another object of this invention is to provide a flexural pivot device having one or more diaphragm members fixedly secured thereto such that the pivot has relatively low axial and torsional stiffness while simultaneously maintaining relatively high radial or shear stiffness.

The invention further lies in the particular organization of the various elements and their cooperative association with one another to produce the beneficial results intended. The foregoing objects and advantages of the invention will appear more fully hereafter from the consideration of the description which follows, taken together with the accompanying drawings wherein several embodiments of the invention are illustrated. It is to be expressly understood, however, that the drawings are for the purpose of illustration and description and not to be construed as defining the limits of the invention.

DETAILED DESCRIPTION OF THE DRAWINGS

Figure 3:
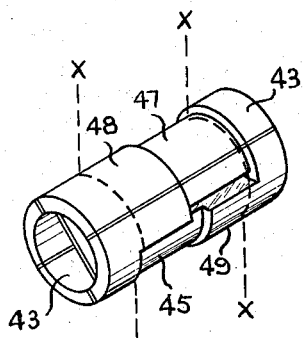
FIG. 3 is a perspective view of the assembly shown in FIG. 2 after being unitized, the parting lines X—X denoting where the core member is cut to provide two axially-extending arcuate elements.
Figure 2:
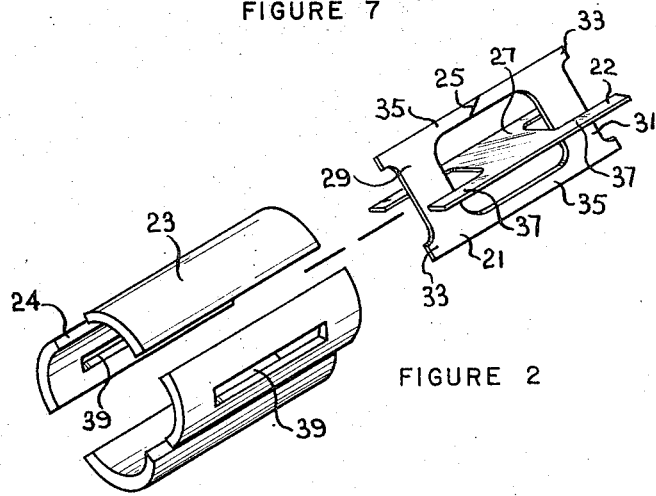
FIG. 2 is an exploded perspective view showing the resilient core assembly used in the pivot of FIG. 1.

Referring to FIGS. 2 and 3, it can be realized that two flat springs 21 and 22 and four sleeve quadrants 23 and 24 are assembled as in FIG. 2 to provide a tubular assembly shown in FIG. 3. I-shaped spring 22 is slipped through insertion opening 25 in the square-D-shaped spring 21 and the cross element 27 is arranged perpendicular to cross bars 29 and 31 of the square-D-shaped spring 21. Spring 21 has at each end of its cross bars 29 and 31 projections or fingers 33 extending perpendicularly. Parts 35 between each end of cross bars 29 and 31 can also be referred to as projections. I-shaped spring 22 also has projections 37. It is to be noted that the cross bars 29 and 31 and cross element 27 merge on a radius to the various projections whereby the cross spring elements are better supported and more durable under flexing when brazed to the quadrants and other structure as will be described. It is apparent that two generally I-shaped springs can be used provided the effective width is about equal, as with the total width of the two cross bars 29 and 31 relative to the cross element 27. The various projections, of course, have the same thickness as the cross members since the springs are made from metal sheet.

Quadrants 24 have axially-extending openings 39 which extend length-wise to adjacent the ends of the quadrants 24 and are opposed in the assembly. These openings 39 become slots which permit pivoting or relative rotation, with flexing of the flat cross springs as will appear, after the further fabrication including bonding as by brazing using flash electro-plated depositions or other means.

In FIG. 3, the bonded tubular assembly is shown. This assembly has semi-circular rib parts 43 between the axial openings 39 and the two flat cross springs 21 and 22 extend between these ribs 43. It is to be noted that the ends of the openings 39 are slightly outward of the radius part of the cross bars 29 and 31 of spring 21. At diagonally-opposite locations, the rib parts 43 are formed or machined by grinding so that the halves have reduced-diameter outer surfaces 45 and 47. These surfaces overhang each other at the center for a purpose that will be explained. The remaining surfaces 48 and 49 of the rib parts 43 at the left and right have the original diameter of the quadrant circle and serve as mounting surfaces.

To obtain the tubular assembly of FIG. 3 the springs 21 and 22 or at least the ends and projections 33 and 37 thereof are thinly coated with a suitable bonding material or agent. Quadrants 23 and 24 are similarly coated, at least at the axial edge portions thereof. As mentioned, electroplating can be used and applied by brush coating. The bonding material will, of course, vary with the material from which the quadrant 23 and 24, and springs 21 and 22 are made. For example, with brass or bronze quadrants a suitable low-melting solder is applied as a thin coating. With steel quadrants, suitable lower-melting metals are thinly electroplated on the contact or bonding surfaces or the surfaces are thinly coated with a suitable brazing material. The bonding in some cases can also be effected by using epoxy resin cement. Depending on the temperature at which bonding is effected, certain steel springs or quadrants are heat treated as required during and after bonding. Since the flexural pivot device of the present invention can be made in sizes from about one-eighth of an inch in diameter for instruments to about 3 inches in diameter for flight control surface elements, it is apparent that the size, the loading, the temperature conditions and other factors will govern the selection of the bonding agent and the material for the quadrants or springs.

The ends of the tubular arrangement are then cutoff at a plane inwardly of the ends of openings 39 at lines X—X to give semi-circular axially-extending arcuate members. By cutting along lines X—X axially inwardly of the ends of openings 39, openings 39 now extend to the ends of quadrants 24 dividing the quadrants into two segments each of 45° or less angular width. Each quadrant 24 may now be termed a divided quadrant.

After forming the tubular structure or assembly, the mounting surfaces 48 and 49 are coated. The inner surfaces of two outer sleeve members 53 and 54 are also coated and these sleeves are forced over or encase the tubular assembly to give the arrangement shown in FIG. 1. After bonding and heat treating for spring characteristics and/or hardness, it is apparent that the inner tubular assembly will be connected at mounting surfaces 48 and 49 to the outer sleeve members 53 and 54 respectively. Outer sleeve 53 has a diaphragm element 53' integrally formed therewith and outer sleeve 54 has a mounting flange 54' also integrally formed therewith. One skilled in the art will appreciate that outer sleeves 53 and 54 could have been formed by encasing the resilient core member within a solid cylindrical member and then cut the cylinder at its center to form the two outer casings 53 and 54. The flexible diaphragm 53' and the mounting flange 54' could then be welded to the outer sleeves as will be described for an alternate embodiment below.

Figure 1:
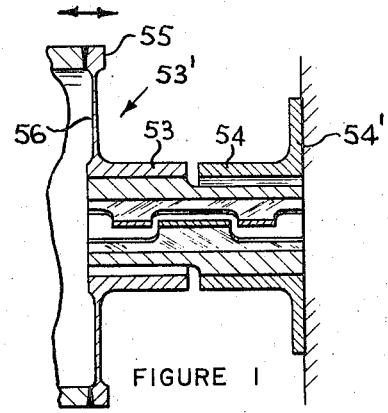
FIG. 1 is a longitudinal cross-sectional view of a cantilever-type flexural pivot device embodying the present invention.
Figure 4:
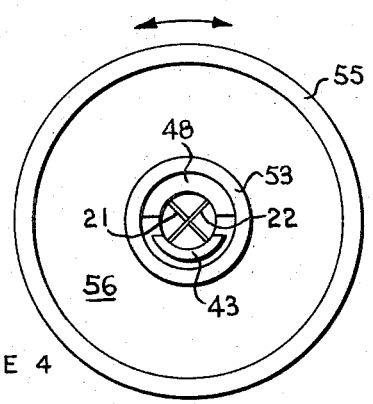
FIG. 4 is an end view of the cantilever-type pivot shown in FIG. 1.

Referring to FIGS. 1 and 4, the flexible disc or diaphragm element 53' is formed integral with and substantially perpendicular to outer sleeve member 53. The flexible diaphragm element 53' has a radially-extending portion 56 having sides which are substantially parallel in cross section and merging outwardly thereof a rigid rim section or circumferential flange 55 of uniform thickness. Flange 55 is the member to which adjoining structure is mounted or secured. When two pieces of external structure which require limited rotation relative to each other are fixedly secured to the mounting flange 54' and a circumferential flange 55 of diaphragm 53', flexing of the diaphragm element in its radially-extending section 56 will accommodate slight misalignment whether due to fixed or varying conditions such as non-rigid supports and set-up errors and tolerances, or such as sag, vibration or thermal expansions. If outer sleeve 53 is rotated relative to outer sleeve 54, springs 21 and 22 will flex and the unit will not introduce any torsional vibrations, nor will they amplify any already present. It is to be noted that all load carrying members are metallic and, since there is no sliding or rubbing surfaces, the pivot assembly 10 does not require lubrication. One skilled in the art will appreciate that diaphragm 53' can be designed for almost any desired stiffness so that radial movement can be restrained while axial movement can be permitted; thus the pivot-diaphragm assembly according to my invention provides an additional degree of freedom while maintaining its normal capabilities and characteristics in the rotational direction. This assembly allows relatively low axial and torsional stiffness without sacrificing the radial or shear stiffness of the pivot.

Figure 5:
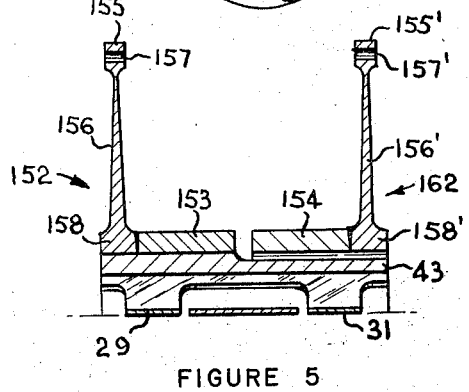
FIG. 5 is a partial longitudinal cross-sectional view of one alternate embodiment of my invention.

Referring to FIG. 5, an alternate embodiment of my invention is shown. In this embodiment two flexible diaphragms 156 and 156' are fixedly secured to the two outer sleeves 153 and 154, respectively, as by electron beam welding, brazing, or the like and the material from which the diaphragm is fabricated can be the same or may be different from the sleeve members 153 and 154. The diaphragms 152 and 162 have an inner mounting flange 158 and 158', a contoured or profile radially-extending sections 156 and 156' and merging outwardly thereof circumferential flanges 155 and 155' having mounting holes 157 and 157' respectively extending axially therethrough. The thin profiled or contoured sections 156 and 156' have radially-decreasing cross-sections to give substantially uniform and torsional stress.

Figure 6:
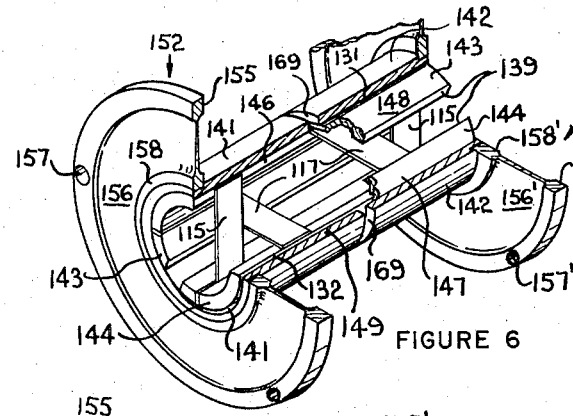
FIG. 6 is a broken-away isometric view of a cantilever-type flexural pivot device similar to the one shown in FIG. 5 showing an alternate internal flexural assembly connecting the two axially-extending arcuate elements.

Referring to FIG. 6, a cantilever type pivot similar to the one shown in FIG. 5 is illustrated having a somewhat different internal flexural assembly. It can be seen that there are two outer sleeve means or tubular members 141 and 142 and two arcuate inner elements 143 and 144. The axially-aligned outer members 141 and 142 are axially-spaced and separated at the peripheral opening 169 while the inner arcuate elements 143 and 144 result from cutting at both ends through openings 139 in an operation similar to that described above for the core shown in FIG. 3. The left tubular member 141 is bonded to mounting surface 133 of the upper arcuate element 143. The right tubular member 142 is likewise bonded to the mounting surface 134 of the lower arcuate element 144. The effective angle included between the adjacent edges of the arcuate elements 143 and 144 is 30° and this angle can have a range of 15° to 45°. The adjacent axially-extending edges of elements 143 and 144 provide stop means to limit safely the flexing of springs and to limit the relative rotation of members 141 and 142. It is to be noted that arcuate elements 143 and 144, respectively, include mounting-surface sections 146 and and 147 and axially-extending reduced-diameter sections 148 and 149 which project into left and right tubular members 42 and 41 and are radially-spaced therefrom. Identically sized flat rectangular springs 115 and 117 which are firmly bonded to the arcuate elements 143 and 144 so that attachment is maintained under adverse flexing conditions and further so that relative axial movement or tilting between the left and right tubular members 141 and 142 is prevented. Crossed springs 115 and 117 at each end provide a rotational axis adjacent to the intersection of the springs. The two identical constructions provided by tubular member 141 and arcuate element 143 and tubular member 142 with arcuate element 144 can be referred to as two cylindrical means each having inwardly-projecting arcuate structures which have finger-like means extending axially. For the left cylindrical means (member 141 and element 143) the arcuate structure consists of mounting-surface section 146 and reduced diameter section 148 which form the finger-like means extending axially into and radially-spaced from the right cylindrical means (member 142 and element 144). For the right cylindrical means, the arcuate structure is formed by mounting-surface section 147 and the reduced-diameter section 149 which forms the finger-like means extending axially into and radially-spaced from the left cylindrical means. With this terminology, the facing parts of arcuate structures are connected by springs 115 and 117 whereby relative rotation between the two cylindrical means on a common axis can be effective. The arcuate structures limit this rotation. The finger-like sections 148 and 149 are spaced radially sufficiently so that contact is prevented during relative rotation of members 141 and 142 when the springs 115 and 117 are flexed. Flexible diaphragm elements 152 and 162 identical to the elements described for FIG. 5 above are fixedly secured to the outer periphery or circumference of outer sleeve members 141 and 142, respectively.

The operation of the flexural pivot device shown in FIG. 6 as a pivotal mounting is believed to be apparent from the foregoing description. Thus, with reference to FIG. 6, an instrument indicator, one end of a butterfly valve, a turbine engine control vane, one end of a flight vehicle control surface or many other devices which are usually mounted in bearings and have limited rotation or pivoting is mounted to the circumferential flange 155 of flexible diaphragm 156 and the right flexible diaphragm 162 is mounted in a hole in support structure and fixed by a set pen or other conventional arrangement. When the instrument indicator, for example, is actuated in a clockwise direction, the left flexible diaphragm 152 is rotated clockwise from the normal position with the flexing of the springs 115 and 117 as is well known in flexural pivot devices. The radial-spacing between the axially-extending finger-like sections 148 and 149 and the facing tubular members 142 and 141 provides clearance upon the flexing or bending of the springs 115 and 117. Rotation can be made in either direction as limited by the abutment of the axially-extending edges of the arcuate elements 143 and 144. It is to be noted that the present easily-replaceable flexural pivot is made from a relatively few parts (which are connected by a simple bonding step) and is more compact for a given capacity than constructions which have springs connected by screws to non-tubular mounting means. Further, stop or limit means are provided in the compact unitized construction of the present invention which permits also economical use and small size applications. Should the pivotal mounting be subject to axial forces such as would be caused by thermal differential growth or cycling axial movement, either or both of the diaphragms 152 and 162 will deflect in their contoured sections 156 and 156', respectively, to prevent damage to both the pivotal mounting and/or the adjoining structure.

Figure 7:
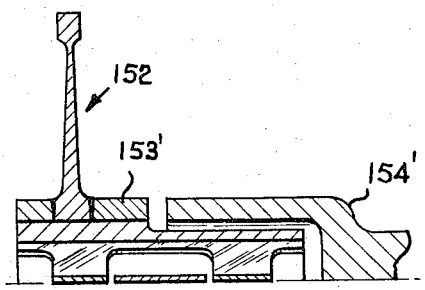
FIG. 7 is a partial longitudinal cross-sectional view of another alternate embodiment of my invention.

Referring to FIG. 7 another alternative embodiment of my invention is shown. In this device the flexible diaphragm 152 shown in FIG. 5 is mounted axially rightward in the drawing from its mounting location shown in FIG. 5 to illustrate that the diaphragm can be mounted at any location along the axially-extending portion of housing 153'. Also, a different type of outer sleeve member 154' is shown to illustrate anyone of a myriad of outer sleeve designs which may be used without departing from the scope of this invention.

Figure 8:
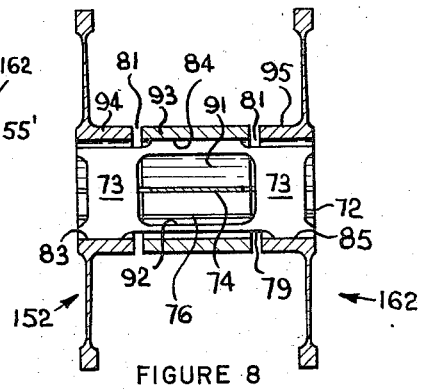
FIG. 8 is a longitudinal cross-sectional view of a double-end-supported flexural pivot device embodying my invention showing two end support members secured to one of the semi-circular arcuate structures and a center support member secured to the other of the semi-circular arcuate structures.

Referring to FIG. 8, it is apparent that, by similar fabricating methods, a double-end-supported flexural pivot is provided. Thus, four quadrants 71 and 72 and two springs 73 and 74 are assembled and bonded to provide a tubular assembly which is then encased by a tubular sleeve to give a tubular arrangement which can be conveniently bonded in a furnace when contact surfaces, at least, are coated with a bonded material as above described. Two quadrants 72 are formed with two axially-extending openings 76 (one appearing) at diametrical locations to provide ribs between the openings 76. A central reduced-diameter surface 79 is formed in one rib and diagonally-opposite two reduced outer diameter outer surfaces 81 are formed in each end part of the other rib which results in mounting surfaces 83, 84, and 85. As for the cantilever-type pivot springs 73 and 74 are mounted between the axial edges of the quadrants to provide crossed, flat springs in perpendicular radial planes. After bonding as was described above for FIGS. 1 and 3, the two ribs are severed through openings 76 to provide two semi-circular arcuate elements 91 and 92 and the sleeve wall is cut through at the outer ends of the bottom recess and the inner ends of the top recesses to provide a center tubular or ring-like member 93 and two end tubular or ring-like members 94 and 95. Arcuate element 91 is bonded to the outer end members 94 and 95 and arcuate element 92 is bonded to the center member 93 while the springs 73 and 74 connect the arcuate elements at axially-spaced locations. The transverse cross-sections would be essentially the same as shown for the above-described cantilever embodiment. As mentioned above, this angle can be within the range of 15° to 45°. Fixedly secured to the end members 94 and 95 are flexible diaphragms 152 and 162 similar to those shown in FIGS. 5 and 6 above. If a particular application required a diaphragm, it could also be mounted to the center member 93.

It is to be noted that end members 94 and 95 and center members 93 counts to with elements 91 and 92 (after bonding) two cylindrical means having inwardly-projecting, diametrically-located arcuate structures which have finger-like means extending axially. As thus described, the opposed or facing arcuate structures are connected by flat springs so that the cylindrical means can be rotated relatively to each other and the arcuate structures provide for limited relative rotation of the axially-spaced cylindrical means arranged on a common axis. The radial-spacing of the finger-like means is such that clearances provided to prevent contact when the cylindrical means are rotated.

The operation of the sectural pivot device of FIG. 8 is basically as above-described except that support is provided at each end of anchoring both tubular end members 94 and 95 through the flexible diaphragms 152 and 162. Thus, a device mounted on the center tubular member 93 can be rotated a limited extent and will be double-end supported by the flexible diaphragms 152 and 162 which diaphragms will also compensate for axial movement in the same manner as was described above for the pivotal mounting of FIG. 6. Such rotation is effected by section springs 73 and 74 and can be made in either direction as limited by the side abutment of the arcuate element 91 and 92.

It is to be understood that changes can be made in the disclosed embodiments and methods by persons skilled in the art without departing from the invention as set forth in the appended claims.

What is claimed is:

1. A flexural pivot device comprising:
   first and second housing means arranged on a common axis and axially spaced from each other;
   said first housing means having an inwardly-projecting arcuate structure, said arcuate structure extending axially into said second housing means and being radially-spaced therefrom;
   said second housing means having inwardly-projecting arcuate structure diametrical of said arcuate structure of said first housing means, said arcuate structure of said second housing means extending axially into said first housing means and being radially-spaced therefrom;
   said arcuate structures having axially-extending edges equally spaced from each other;
   crossed flat spring means connecting said arcuate structures so that said first and second housing means are rotatable relative to each other on said common axes; and
   first flexible diaphragm means fixedly secured to the outer periphery of said first housing means and to an adjoining structure thereby permitting simultaneous relative axial and rotary movement between said first and second housing means.

2. The combination as claimed in claim 1 including in addition second flexible diaphragm means fixedly secured to the outer periphery of said second housing means and to an adjoining structure.

3. The combination as claimed in claim 1 wherein said flexible diaphragm means is formed integral with said first housing means.

4. The combination as claimed in claim 1 wherein said flexible diaphragm means includes at least one annular diaphragm element, said diaphragm element having a circumferential flange and inwardly thereof a contoured section having radially-outwardly-decreasing thickness such that substantially uniform bending and torsional stress results.

5. The combination as claimed in claim 1 wherein said first housing means includes two end support members, said arcuate structure of said first housing means connecting said two end support members; and said second housing means include a center support member positioned between said two end support members and adapted to be a rotatable mounting, said arcuate structure of said second housing means being a first section extending beyond one end of said center support member and a second section extending beyond the other end of said center support member.

6. The combination as claimed in claim 5 wherein said flexible diaphragm means is fixedly secured to at least one of said end support members.

7. The combination as claimed in claim 5 including in addition second flexible diaphragm means fixedly secured to said center support member and to an adjoining structure.

8. In combination with a flexural pivot device of the type having a pair of flat crossed springs, each of the crossed springs having at least one side projection at each end, each side projection extending perpendicularly from the side end of its spring and being the same thickness as said spring to provide connecting segments, two arcuate quadrant elements and two arcuate divided-quadrant elements positioned alternately between the connecting segments and joined thereto to provide a tubular assembly having two semi-circular-like members interconnected by crossed flat springs and spaced at the lengthwise edges thereof, first outer sleeve means connected to one of the semi-circular-like members and radially spaced from the other member, second outer sleeve means connected to the other of the semi-circular members and radially spaced from the first sleeve member, wherein the improvement comprises:
   first flexible diaphragm means fixedly secured to said first outer sleeve means whereby said second outer sleeve means and to an adjoining structure can be fixed and said first outer sleeve means can be rotated with flexing of said crossed springs while simultaneously permitting axial deflections to be absorbed by said flexible diaphragm means.
9. The combination as claimed in claim 8 including in addition second flexible diaphragm means fixedly secured to said second outer sleeve means and to an adjoining structure.

* * * * *